No. 845,709. PATENTED FEB. 26, 1907.
J. G. GLADDING.
COMBINED LADDER HOOK, SPANNER, AND HOSE CARRIER.
APPLICATION FILED JULY 29, 1905.

WITNESSES: INVENTOR:
John Hope Jr. Jesse G. Gladding
Walter E. Burton S. Scholfield
BY ATTY.

THE NORRIS PETERS CO., WASHINGTON, D. C.

UNITED STATES PATENT OFFICE.

JESSE G. GLADDING, OF RIVERSIDE, RHODE ISLAND.

COMBINED LADDER-HOOK, SPANNER, AND HOSE-CARRIER.

No. 845,709.　　　Specification of Letters Patent.　　　Patented Feb. 26, 1907.

Application filed July 29, 1905. Serial No. 271,829.

*To all whom it may concern:*

Be it known that I, JESSE G. GLADDING, a citizen of the United States, residing at Riverside, in the county of Providence and State of Rhode Island, have invented a new and useful Improvement in a Combined Ladder-Hook, Spanner, and Hose-Carrier, of which the following is a specification.

My invention consists in an improved implement for fireman's use whereby he is enabled to carry forward and lighten up the hose and to manipulate the hose-couplings and also to hook himself to the round of a ladder, so as to leave him free to use both hands for any purpose required, the said implement being of extremely light construction and readily carried in the pocket.

Figure 1:
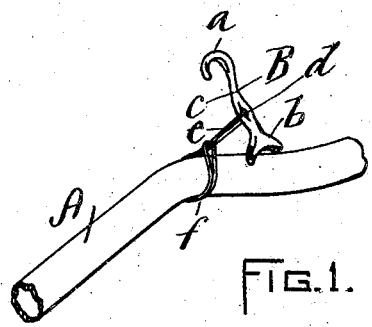
Figure 3:
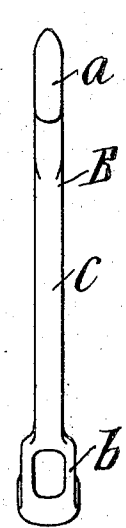
Figure 2:
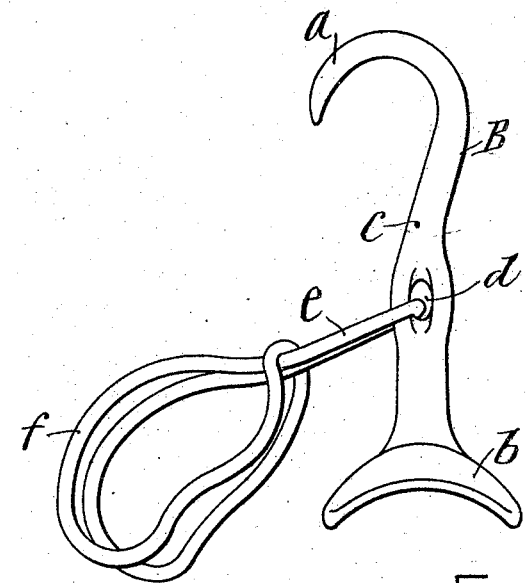
Figure 4:
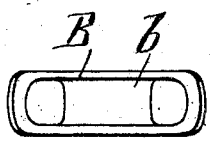

In the accompanying drawings, Figure 1 represents a perspective view of my invention as connected with a line of fire-hose for moving the same forward. Fig. 2 represents a side view of the same separate from the line of hose. Fig. 3 represents a front edge view without the connecting-rope. Fig. 4 represents a view of the spanner end of the implement without the connecting-rope.

In the drawings, A represents a section of fire-hose, and B the improved fireman's implement, which comprises the ladder-hook $a$ and the spanner $b$ with the handle-bar $c$ between them, the said handle-bar being provided at near its middle portion with the eye $d$, in which is secured the rope $e$ for attaching the implement to the hose, the said rope serving to form a clasping-noose $f$. The attachment of the implement B to the fire-hose A is shown in Fig. 1, and in this case when the handle-bar $c$ is grasped by the hand of the fireman the hose may be lifted from the ground and carried forward. The hook $a$ is adapted for engagement with the rung of the ladder or other support, and the enlargement formed by the spanner $b$ at the end of the handle-bar serves to form a support for the hand of the fireman when grasping the handle-bar to carry the hose, and also when grasping the said handle-bar after the enclasped hose is hooked to the rung of a ladder and the fireman desires to employ the hook as a hand-support the said enlargement formed by the spanner serves to prevent the hand of the fireman from slipping off of the end of the handle-bar $c$.

I claim as my invention—

An implement of the character described, comprising the handle-bar having a hook at one end and a spanner at the other, which latter forms an enlargement for the support of the hand at the end of the handle-bar opposite the hook, the eye located in the handle-bar between the hook and the spanner, and the rope held in the eye of the handle-bar to form a noose for attaching the implement to the hose.

JESSE G. GLADDING.

Witnesses:
　SOCRATES SCHOLFIELD,
　MINNIE E. RANNEY.